2,861,061
METHOD FOR TREATING GLUTEN

Eric A. Borel and Robert H. Cotton, Harbor Beach, Mich., assignors to Hercules Powder Company, Wilmington, Del., a corporation of Delaware No Drawing. Application November 27, 1956
Serial No. 624,491

12 Claims. (Cl. 260—123)

This invention relates to a method for processing gluten to produce vital glutenin and vital gliadin.

It is well known that gluten is comprised chiefly of gliadin and glutenin. Both are relatively complex. There is evidence that glutenin and gliadin, as they occur in native gluten, contain opposite charges. These opposite charges, which arise from and are dependent on the relative quantities of glutenin and gliadin that are present, are thought to interact to at least partially account for the physical properties of gluten. Various procedures have been used in the past to isolate gliadin from gluten. One well known procedure has involved the dissolving of gliadin from gluten with aqueous alcoholic solutions and thereafter concentrating the extract under diminished pressure and precipitating the gliadin from the extract by salting with an alkali metal salt under vigorous agitation. This procedure is difficult to control on a commercial basis, and uneconomically expensive because of the alcohol extraction step and the complications inherent in alcohol handling and recovery and for these reasons, among others, the process has not received wide acceptance. Other procedures have involved preliminary drying of the gluten, then contacting the dried gluten with a weak acetic acid solution to dissolve the gliadin, and subsequently precipitating the gliadin by salting with sodium chloride under agitation. Another procedure employed citric acid instead of acetic acid. The known processes employing acid reactions to dissolve gliadin are successful in isolating the gliadin but are unsuccessful in the sense that the glutenin portion is devitalized and of little or no value as a vital protein. Prior attempts to utilize such glutenin by-products as protein supplements in flour were unsuccessful because the glutenin supplement detrimentally affected the baking quality by reducing the quantity of rise and impairing the texture of the baked product.

The primary object of the present invention is to provide an easily controlled, inexpensive process for separating gluten into useful gliadin and a vital and useful glutenin which is well adapted for use in supplementing the protein content of bread and related products.

Another object of this invention is to provide a process for separating vital glutenin and vital gliadin from gluten which employs as the starting material an undried gluten which conveniently may be the wet gluten obtained from a conventional flour washing operation, the object of which is to produce starch and gluten.

It has now been found that, in accordance with this invention, the above mentioned and related objects can be accomplished by contacting undried gluten with an excess of a dilute aqueous acidic solution under controlled reaction conditions and thereafter separating the reaction product into the glutenin and gliadin fractions. It has been found to be extremely important to the success of the process to initially establish and to maintain the temperature of the acidic reaction of the gluten within the range of about 40° C. to about 70° C. When the temperature of the reacting mixture is below about 40° C. the acidic reaction fails to produce a reaction product from which a good separation of the gliadin from the glutenin can be obtained. When the temperature of the reacting mixture exceeds about 70° C. the glutenin fraction which results is devitalized, i. e., it is unsatisfactory as a protein supplement in bread, etc. When the temperature is kept within the range of about 40° C. to about 70° C. the reaction product is relatively easily separated into gliadin and glutenin fractions by simple filtration since the gliadin is dissolved and the glutenin is not in solution. The preferred operating temperature is about 57° C.

It is also important to this process to agitate the gluten during the reacting period. In the absence of agitation not all of the wet gluten raw material is contacted uniformly with the acidic solution and an incomplete reaction occurs. It is possible, on the other hand, to agitate the gluten-reaction mixture too violently and when this happens, the glutenin breaks up into small particles which cannot be separated effectively and economically from the reaction solution such as by filtration. When the reaction proceeds in the temperature range of 40° C.–70° C. and the gluten is subjected to mild agitation for a few minutes, e. g. for 1–20 minutes and preferably 5 to 15 minutes, the liquid reaction solution continues to be clear and when the agitation has ceased the supernatant liquid is clear-opalescent. If, however, the agitation during reaction is violent, the glutenin disperses in the reaction solution making it turbid. This turbidity of the reaction solution can be discerned during the reaction and in order to obtain the desired results should be avoided. A satisfactory degree of agitation is that amount which mixes the gluten and reacting solution until the gluten is uniformly mixed into the solution without causing the reaction solution to become turbid, and for the purposes of the appended claims the expression "mild agitation" is to be understood to have this meaning.

The degree of acidity of the reaction solution is important and satisfactory results are obtained when the solutions are relatively weakly acidic and operated at a pH in the range of about 3.0 to about 4.0. Preferably the solutions are maintained between a pH of 3.5 and 3.8 and are about 0.1 normal solutions or weaker.

A large number of acids are satisfactory for use in the reaction with undried gluten as long as the above specified conditions are observed. The most important requirement which the selected acid must satisfy is that the acid must dissolve gliadin and not dissolve glutenin under the given conditions. Acids which satisfy this requirement and which are preferred for commercial use include citric acid, acetic acid, formic acid, lactic acid, propionic acid, maleic acid and fumaric acid. Part of the acid may be one or more mineral acids such as phosphoric, sulfuric and hydrochloric acids, and mixtures of the organic acids may be used if desired. Other satisfactory, but less desirable acids include tartaric, gluconic, succinic, aconitic, malonic, adipic and malic acids. Of the above acids, acetic, citric and propionic are especially preferred. It was observed that bread baked with vital glutenin obtained from the process of this invention when propionic acid was employed exhibited superior resistance to the formation of mold.

The undried or vital gluten may be reacted with the aqueous acidic solution by immersing chopped gluten in the solution or, if desired, for large scale continuous production, the acidic solution may be sprayed on the gluten and in this case it is desirable that the gluten be in a finely divided form. So long as there is an excess of the dilute acidic solution in contact with the gluten and the above specified conditions are observed, the objects of this invention are realized. The starting material cannot be a gluten material which has been devitalized or denatured by heating. When gluten is preliminarily dried by conventional procedures employing temperatures above about 170° F.–200° F., it is not usable as the starting material in the process. When, therefore, the term "vital gluten" is used in the appended claims, it is intended to refer to gluten which has not been preliminarily heat dried and to specifically include undried and wet gluten. Wet gluten resulting from washing flour normally contains about 70% moisture by weight and this material is an excellent starting material for this process.

After the acidic reaction is completed, the glutenin and gliadin are separated in the reaction product by decantation or by filtering. When the reaction product is filtered it is desirable that the filtration be effected while the solution is approximately at the reaction temperature. When decantation is employed, the reaction mixture is first allowed to settle a few minutes and then the supernatant liquid containing gliadin is decanted. The glutenin in the residue from the decantation step is coagulated by adjusting the pH to the range of 5.0–7.0 and again decanting the supernatant liquid. The residue from this step, when dried, is the glutenin product of this invention. Coagulation of the glutenin can be accomplished by salting out, if desired. When filtration is used, the gliadin-containing filtrate solution can be treated by heretofore known methods for precipitating gliadin. According to this invention it is preferred that the gliadin-containing filtrate solution be ultra-centrifuged to remove starch and fat which may be present, and the gliadin precipitated by the adjustment of pH to above 5.0 by the use of ammonia, alkali, or by salting out, for example with sodium or lithium chloride, etc. The precipitated gliadin can then be dried in any conventional manner such as in air, or slightly warmed air, vacuum dried, or if desired may be redispersed in acetic acid and spray dried by conventional spray drying techniques. The gliadin product of this invention is suitable for use as a whipping agent and is particularly useful as a substitute for egg whites and the like because of its stability in dried form. It has also been observed that the gliadin product obtained from this process when citric acid is employed has better whipping properties over a wider range of pH values than the gliadin product which is obtained when other acids are used. When citric acid is used, the gliadin is further improved by modifying the above process in the following manner. After extracting the gliadin with citric acid as above described and the glutenin has been filtered off, the filtrate is ultra-centrifuged to remove starch and at least some of the fat. Gliadin is then precipitated by raising the pH to the range of about 5 to 6 with ammonium hydroxide and after decanting the supernatant liquid the precipitated gliadin is reacidified with phosphoric acid to a pH of about 3.0 to 4.0, and preferably to about 3.5, while stirring. The acidified gliadin is then dried in conventional manner. It has been observed that the whipping characteristics of formulations including this modified form of gliadin produce markedly better foaming qualities in the presence of cations normally found in hard water. This is illustrated in Example V. The phosphoric acid can satisfactorily be added as concentrated $H_3PO_4$ or weaker aqueous solutions thereof so long as a sufficient quantity is added to react the above indicated pH of 3.0–4.0.

The glutenin residue from the filtration step is converted to the vital glutenin product of this invention when it is adjusted to a pH in the range of about 5.8 to about 7.0, preferably about 6.0, with a conventional alkaline material such as alkali metal hydroxide or carbonate, etc. and then dried at low temperature.

The vital glutenin product and the method of this invention are described in greater detail in the examples which are given below. It is to be understood that the particular reactants and the particular conditions employed are illustrative only and that the above given limits are the defining limits of this invention.

EXAMPLE I

Wet gluten obtained from the aqueous washing of wheat was chopped into approximately ordinary dice-size pieces and 1000 grams thereof were added to 6 liters of a solution 0.05 N in citric acid and 0.025 N in acetic acid. The solution was mildly agitated and maintained at 50° C. throughout the test. After reaction for the varying times shown in tabular form below, the solutions were immediately filtered. From the solution, the gliadin was precipitated by salting out which was induced by adding 1% sodium chloride solution accompanied by vigorous shaking. The glutenin residue was raised to a pH of 6.0 with sodium hydroxide. When the pH of the crude glutenin residue is raised to pH 5 or above, the glutenin coalesces with a reduction in moisture content from approximately 90% to 70% with a resulting economy in drying of the product. The result can also be accomplished by salting out the glutenin. The gliadin and glutenin were then dried.

The gliadin obtained is a substantially pure gliadin and can be easily distinguished from a glutenin contaminated material by observing its ability to pour when in the wet stage. In this form the gliadin syrupy mixture pours in a continuous stream of filament and exhibits pour characteristics comparable to commercial honey. Glutenin contaminated mixtures of gliadin in the presence of a similar quantity of water will not pour in a continuous stream but rather is more solid and dough-like and breaks when slowly poured. The glutenin which is obtained is generally similar in appearance to gluten. When wet, vital glutenin is a cohesive, elastic, tough mass which is light tan to gray in color. It is elastic and actually tougher than gluten. Vital glutenin is easily distinguished from devitalized glutenin since devitalized glutenin has practically no cohesiveness or elasticity when wet. Devitalized glutenin is unsuitable as an additive in bread since it drastically reduces the loaf volume or rise characteristics when added to the other conventional bread ingredients.

For the purpose of testing the vitality of the crude glutenin product of this invention, the glutenin was tested as a protein supplement in bread by evaluating its effect on the normal baking characteristics. The baking test used for evaluating the vital glutenin product of this invention was conducted by using a standard bread formula for reference purposes and modifying the formula with the glutenin product of this invention. The standard bread formula consists of straight grade spring wheat bakers flour, and 3% yeast, 5% sugar and 1% salt, the percentages being by weight of the flour in its as-received condition (approximately 8% moisture). All of the below given volumes, except control volumes, were obtained by replacing 10% of the flour, by weight, with the particular glutenin product shown. The glutenin product, after weighing, was homogenized in a small amount of water before being added to the other ingredients. The mixture was admixed in a Hobart C–100 mixer for 6 minutes. After mixing, the dough was fermented at 86° F. for 70 minutes, then punched, and after 35 additional minutes was divided into 150 gram dough pieces. After 15 more minutes the dough was panned and allowed to rise further at 86° F. for 55 minutes. Baking was then done at 430° F. for 25 minutes and the loaf volume was measured and compared to a standard loaf baked under identical conditions except that the mix contained no glutenin. The effect on the loaf volume can be seen in Table 1. It will be noticed that the loaf volume is increased compared to the control volume and, of course, the protein content of the bread has been effectively raised as the result of the presence of 10% by weight of vital glutenin.

*Table 1*

| Acidic reaction time in minutes | Temp., °C. | Gliadin grams, dry | Glutenin grams, dry | Volume bread in ml. |
|---|---|---|---|---|
| Control (base flour 100%) | | | | 807 |
| 2.5 | 50 | 19.5 | 251.1 | 945 |
| 5.0 | 50 | 24.9 | 250.2 | 925 |
| 7.5 | 50 | 38.4 | 238.5 | 908 |
| 10.0 | 50 | 42.3 | 226.2 | 885 |
| 15.0 | 50 | 52.2 | 219.9 | 870 |
| Heat devitalized glutenin | | | | 400 |

EXAMPLE II

Another series of tests were run in which the reaction conditions were identical to those set forth in Example I except that the acidic reaction temperature was maintained at 60° C. The baking test described in Example I was used and the results obtained, including baking test results, are set forth in Table 2.

*Table 2*

| Acidic reaction time in minutes | Temp., °C. | Gliadin grams, dry | Glutenin grams, dry | Volume bread in ml. |
|---|---|---|---|---|
| Control | | | | 810 |
| 2.5 | 60 | 18.5 | 262.2 | 865 |
| 5.0 | 60 | 28.6 | 258.9 | 850 |
| 7.5 | 60 | 43.5 | 231.6 | 875 |
| 10.0 | 60 | 42.9 | 201.9 | 780 |
| 15.0 | 60 | 56.2 | 192.0 | 753 |

EXAMPLE III

Another series of tests were run in which the reaction conditions were identical to those set forth in Example I except the temperature was maintained at 70° C. throughout the reaction. The baking test described in Example I was used and the results obtained, including baking test results, are set forth in Table 3. It will be noted that the loaf volumes resulting from mixes including glutenin obtained from reaction at 70° C. are reduced from that of the control. No increase in loaf volume was noted when the reaction temperature exceeded 68° C.

*Table 3*

| Acidic reaction time in minutes | Temp., °C. | Gliadin grams, dry | Glutenin grams, dry | Volume bread in ml. |
|---|---|---|---|---|
| Control | | | | 800 |
| 2.5 | 70 | | 225.0 | 730 |
| 5.0 | 70 | 33.0 | 225.0 | 750 |
| 7.5 | 70 | 42.0 | 202.8 | 565 |
| 10.0 | 70 | 41.1 | 193.2 | 485 |
| 15.0 | 70 | 55.5 | 177.0 | 490 |

EXAMPLE IV

A further series of tests were run with different acids and at different strengths. These tests used undried gluten in small particle form as the starting material and contacted the gluten with the solution at 60° C., under mild agitation for 10 minute intervals before separation of the glutenin from the reaction solution. The results are set forth in Table 4.

*Table 4*

| Acid | Acid | Water, ml. | Gluten Gr., dry | Gliadin Gr., dry | Gliadin Percent | Glutenin Gr., dry | Glutenin Percent | pH |
|---|---|---|---|---|---|---|---|---|
| Citric—0.1 N | | 3,000 | 145.9 | 29.5 | 20.1 | 73.2 | 50.2 | |
| Citric—0.025 N | | 3,000 | 145.8 | 26.7 | 18.4 | 88.9 | 61.0 | |
| Citric—0.1 N | Acetic—0.05 N | 6,000 | 300.0 | 62.4 | 20.8 | 153.0 | 51.0 | |
| Citric—0.05 N | do | 3,000 | 149.7 | 33.3 | 22.5 | 77.4 | 51.0 | |
| Do | Acetic—0.025 N | 6,000 | 300.0 | 64.5 | 21.5 | 168.9 | 56.4 | |
| Citric—0.025 N | do | 3,000 | 150.0 | 26.6 | 17.7 | 114.0 | 76.5 | |
| Do | Acetic—0.05 N | 6,000 | 300.0 | 32.0 | 10.7 | 183.0 | 61.0 | |
| Citric—0.05 N | do | 1,200 | 60.0 | 9.8 | 16.4 | 47.5 | 79.1 | 3.5–3.8 |
| Citric—0.066 N | | 1,200 | 60.0 | 9.9 | 16.5 | 42.0 | 70.0 | 3.5–3.8 |
| Lactic—0.045 N | | 1,200 | 60.0 | 10.0 | 16.7 | 48.3 | 80.5 | 3.5–3.8 |
| Acetic—0.05 N | | 1,200 | 60.0 | 9.6 | 16.0 | 46.5 | 77.5 | 3.5–3.8 |
| Fumaric—0.043 N | | 1,200 | 60.0 | 9.2 | 15.3 | 46.6 | 77.7 | 3.5–3.8 |
| Formic—0.081 N | | 1,200 | 60.0 | 10.6 | 17.7 | 41.5 | 69.2 | 3.5–3.8 |
| Propionic—0.57 N | | 1,200 | 60.0 | 9.7 | 16.2 | 47.9 | 79.6 | 3.5–3.8 |
| Maleic—0.036 N | | 1,200 | 60.0 | 9.3 | 15.5 | 44.4 | 74.0 | 3.5–3.8 |
| Citric—0.05 N | $H_3PO_4$—0.043 N | 1,200 | 60.0 | 12.0 | 20.0 | 38.5 | 64.1 | 3.5–3.8 |
| Do | HCl—0.0024 N | 1,200 | 60.0 | 12.1 | 20.0 | 40.5 | 67.5 | 3.5–3.8 |

EXAMPLE V

Wet gluten obtained from the aqueous washing of wheat was chopped into approximately ordinary dice-size pieces and 1000 grams thereof were added to 6 liters of an aqueous solution of 0.1 N in citric acid; the solution was mildly agitated and maintained at 57° for 10 minutes. The glutenin was separated from the reaction solution by filtering while hot. The reaction solution was raised to a pH of about 6 by adding ammonium hydroxide thereto and gliadin precipitated in the solution. The supernatant liquid was decanted and concentrated phosphoric acid (85%) was added to the gliadin precipitate with stirring until the pH reached 3.5. The acidified gliadin was then dried.

Quantities of gliadin produced by the above method were tested in comparison with gliadin produced by the method of this invention except no phosphoric acid was added to the gliadin after its precipitation by incorporating portions of each type of gliadin in a frosting formulation consisting of 150 grams granulated sugar, 50 grams powdered dextrose, 10 grams pre-gelatinized starch and 6 grams of gliadin. The ingredients were blended and admixed with 125 cc. of water and then whipped at high speed for 6 minutes with a mechanical rotating beater. The total volume of the whipped mixture was then measured. The effect of the presence of cations in the water or hardness of the water on the ability of the gliadin to promote whipping is illustrated by the results set forth in tabular form below. In each case the gliadin designated "standard" was prepared by exactly the same procedure as that set forth above for the phosphoric acid modified samples except no phosphoric acid was added to the gliadin after precipitation.

Table 5

| Water origin | Total hardness calculated as CaCO₃ | Gliadin type | Total foam vol. in ml. |
| --- | --- | --- | --- |
| Distilled water | | Standard process | 1,000 |
| Do | | Phosphoric acid added | 1,100 |
| Minneapolis city water | 89 | Standard process | 950 |
| Do | 89 | Phosphoric acid added | 1,000 |
| Pillsbury well water | 459 | Standard process | 200 |
| Do | 459 | Phosphoric acid added | 980 |
| Schmalz well water | 525 (2,250 p. p. m. NaCl) | Standard process | 200 |
| Do | 525 (2,250 p. p. m. NaCl) | Phosphoric acid added | 800 |
| Donahue well water | 776 (300 p. p. m. NaCl) | Standard process | 200 |
| Do | 776 (300 p. p. m. NaCl) | Phosphoric acid added | 900 |

What is claimed is:

1. A method for treating vital gluten to effect separation of gliadin and vital glutenin therefrom which comprises the steps of (1) reacting undried vital gluten in an aqueous acidic solution having a pH of about 3.0 to about 4.0 at a temperature between 40° C. and 70° C. for 1 to 20 minutes while mildly agitating the same, and (2) separating the glutenin and gliadin from the said reaction solution.

2. A method for treating vital gluten to effect separation of gliadin and vital glutenin therefrom which comprises the steps of (1) reacting undried vital gluten in an aqueous acidic solution having a pH of about 3.0 to about 4.0 at a temperature between 40° C. and 70° C. for 2.5 to 20 minutes while mildly agitating the same, (2) allowing the reaction solution to settle and thereafter decanting the supernatant liquid therefrom, (3) adjusting the pH of the residue from step #2 to the range of 5.0-7.0 and decanting the supernatant liquid therefrom, and (4) thereafter drying the residue from step #3.

3. A method for treating vital gluten to effect separation of gliadin and vital glutenin therefrom which comprises the steps of (1) reacting undried vital gluten in an aqueous acidic solution having a pH of about 3.0 to about 4.0 at a temperature between 40° C. and 70° C. for 5 to 15 minutes while mildly agitating the same, (2) separating the glutenin from the said reaction solution, (3) centrifuging the supernatant liquid from step 2 to remove the starch and fat therefrom and (4) adjusting the pH of the solution from step #3 to above about 5.0 and separating the gliadin therefrom.

4. A process in accordance with claim 1 wherein the temperature is about 57° C. and the pH of said reaction solution is about 3.5-3.8.

5. A method for treating vital gluten to effect separation of gliadin and vital glutenin therefrom which comprises the steps of (1) reacting undried vital gluten in an aqueous acidic solution having a pH of about 3.0 to about 4.0 at a temperature between 40° C. and 70° C. for 2.5 to 20 minutes while mildly agitating the same, (2) separating the glutenin from the said reaction solution, and (3) neutralizing said glutenin to a pH between about 5.8 and 7.0 and thereafter drying the same.

6. A process in accordance with claim 1 wherein the said acidic solution is a mixture of acetic and citric acids.

7. A process in accordance with claim 1 wherein the said acidic solution is a citric acid solution.

8. A process in accordance with claim 1 wherein the said acidic solution is a propionic acid solution.

9. A process in accordance with claim 1 wherein the said acidic solution is a mixture of citric and phosphoric acids.

10. A process in accordance with claim 1 wherein the said acidic solution is a mixture of citric acid and hydrochloric acid.

11. A method for treating vital gluten to effect separation of gliadin and vital glutenin therefrom which comprises the steps of (1) reacting undried vital gluten in an aqueous acid solution having a pH of about 3.0 to about 4.0 at a temperature between 40° C. and 70° C. for 2.5 to 20 minutes while mildly agitating the same, (2) separating the glutenin from said reaction solution, (3) adjusting the pH of the solution from step #2 to about 5.0 to 6.0 to precipitate gliadin therefrom, (4) separating the gliadin, and (5) acidifying the said gliadin with phosphoric acid to a pH in the range of about 3.0 to about 4.0.

12. A method for treating vital gluten to effect separation of gliadin and vital glutenin therefrom which comprises the steps of (1) reacting undried vital gluten in an aqueous solution of citric acid having a pH of about 3.0 to about 4.0 at a temperature of 40° C. and 70° C. for 5 to 15 minutes while mildly agitating the same, (2) separating the glutenin from the reaction solution of step #1, (3) centrifuging the solution from step #2, (4) adjusting the pH of the centrifuged solution of step #3 from about 5.0 to 6.0, (5) separating the gliadin from the solution of step #4, (6) acidifying the said gliadin from step #5 with phosphoric acid to a pH in the range of about 3.0 to about 4.0 and (7) thereafter drying said acidified gliadin.

References Cited in the file of this patent

Sagi: Trans. Amer. Assoc. of Cereal Chemists, vol. 12 (1954), pages 56–9.

Schmidt: Chemistry of the Amino Acids and Proteins (1938), pages 617–8.